United States Patent [19]

Bessert

[11] Patent Number: 5,477,649
[45] Date of Patent: Dec. 26, 1995

[54] RAISED FLOOR CABLE TROUGH SYSTEM

[75] Inventor: David D. Bessert, Roselle, Ill.

[73] Assignee: Airtite Contractors Inc., Chicago, Ill.

[21] Appl. No.: 55,521

[22] Filed: Apr. 30, 1993

[51] Int. Cl.[6] .................................. E04B 5/43; H02G 3/06
[52] U.S. Cl. .......................... 52/263; 52/126.2; 52/126.6; 52/126.7; 52/220.1; 52/220.5; 174/48
[58] Field of Search ............................ 174/48; 52/220.5, 52/263, 126.4, 220.3, 220.5, 126.2, 126.5, 126.6, 126.7, 220.1

[56] References Cited

U.S. PATENT DOCUMENTS

| | | |
|---|---|---|
| Re. 33,220 | 5/1990 | Collier ........................................ 52/263 |
| 2,867,301 | 1/1959 | Benton . |
| 3,131,512 | 5/1964 | MacLeod, Jr. ............................. 174/48 |
| 3,157,254 | 11/1964 | Spiselman et al. . |
| 3,166,633 | 1/1965 | Guzan et al. . |
| 3,204,378 | 9/1965 | Stuessel et al. . |
| 3,281,005 | 10/1966 | Schumacher ............................. 174/48 |
| 3,316,680 | 5/1967 | Chrastek . |
| 3,516,347 | 6/1970 | May . |
| 3,592,956 | 7/1971 | Fork . |
| 3,604,165 | 9/1971 | Naillon . |
| 3,784,042 | 1/1974 | Hadfield et al. . |
| 3,844,440 | 10/1974 | Hadfield et al. . |
| 3,886,702 | 6/1975 | Fork . |
| 3,903,667 | 9/1975 | Zetlin . |
| 3,924,370 | 12/1975 | Cauceglia et al. . |
| 4,016,357 | 4/1977 | Abrahamsen . |
| 4,034,526 | 7/1977 | Deslaugiers . |
| 4,124,324 | 11/1978 | Augis et al. ........................ 52/220.5 X |
| 4,178,469 | 12/1979 | Fork . |
| 4,194,332 | 3/1980 | Fork ........................................ 174/48 |
| 4,465,288 | 8/1984 | Kofoed, Sr. . |
| 4,596,095 | 6/1986 | Chalfant ............................. 52/220.3 X |
| 4,630,417 | 12/1986 | Collier . |
| 4,656,795 | 4/1987 | Albrecht et al. . |
| 4,676,036 | 6/1987 | Bessert ........................................ 52/263 |
| 4,850,162 | 7/1989 | Albrecht . |
| 4,899,506 | 2/1990 | Chapman et al. . |
| 4,931,597 | 6/1990 | Kimbrough et al. .................... 174/48 |
| 5,003,737 | 4/1991 | Penczak . |
| 5,049,700 | 9/1991 | Kobayashi et al. ...................... 52/263 |
| 5,152,698 | 10/1993 | Juhlin et al. ............................ 174/48 |

FOREIGN PATENT DOCUMENTS

| | | |
|---|---|---|
| 742882 | 9/1966 | Canada . |
| 0067134 | 12/1982 | European Pat. Off. . |
| 0076143A1 | 3/1983 | European Pat. Off. . |
| 0155759A2 | 9/1995 | European Pat. Off. . |
| 1306680 | 9/1962 | France . |
| 2244596 | 3/1974 | Germany . |
| 6-17524 | 1/1994 | Japan . |
| 2115853 | 9/1983 | United Kingdom . |

*Primary Examiner*—Carl D. Friedman
*Assistant Examiner*—Christopher Todd Kent
*Attorney, Agent, or Firm*—McAndrews, Held & Malloy, Ltd.

[57] ABSTRACT

An underfloor cable trough assembly can be employed in new or existing raised floor assemblies having removable floor panels supported at a preselected height above a subfloor by a series of vertical pedestals. Modular cable trough sections are disposed between the subfloor and the raised floor panels and can be joined to form a trough network. At least some of the trough sections have apertures formed in their side walls at regularly spaced intervals. Removable cover plates are disposed in the side wall apertures. The cover plates serve as a portion of the trough side wall when installed and are removable to permit individual trough sections to be joined to each other. In addition, the removable floor panels serve as covers for the trough sections.

32 Claims, 4 Drawing Sheets

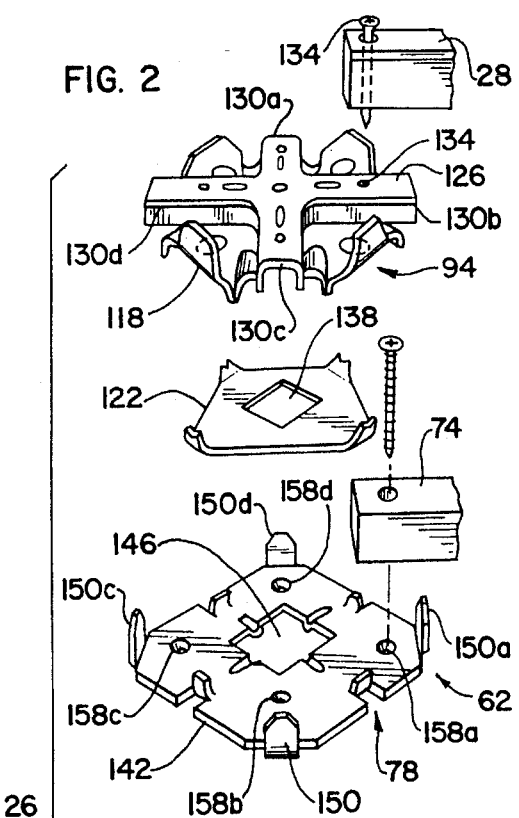
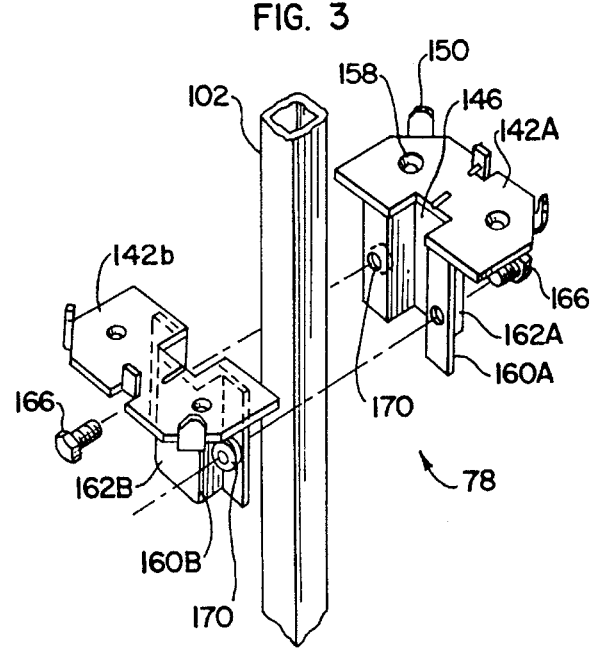
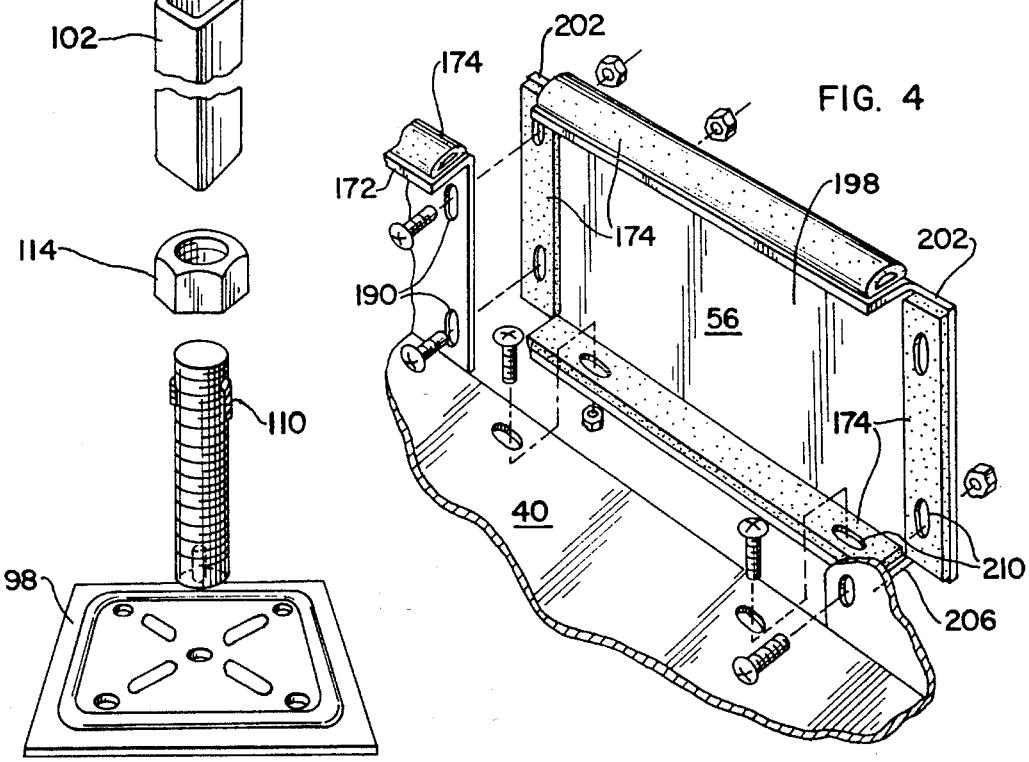

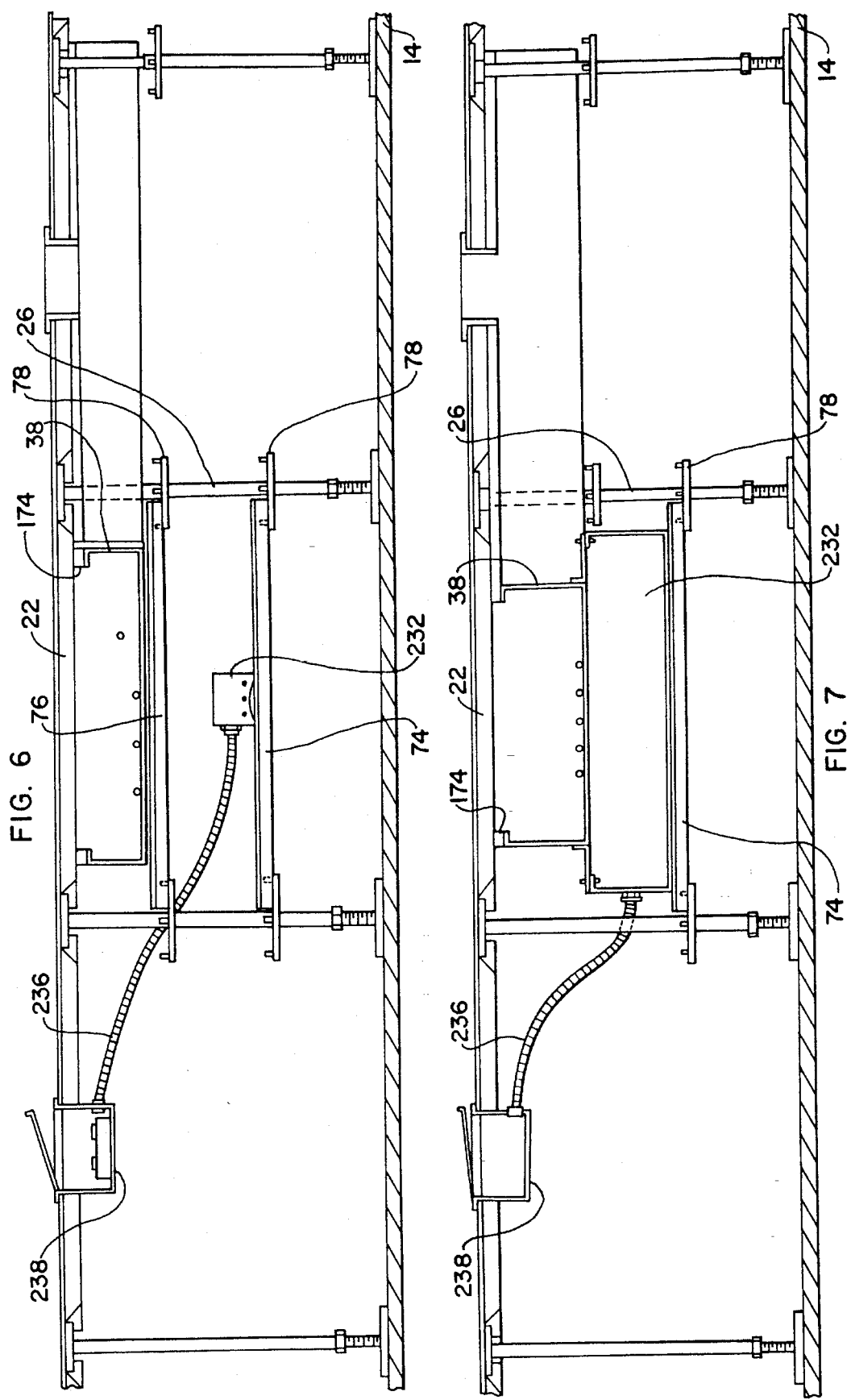

RAISED FLOOR CABLE TROUGH SYSTEM

FIELD OF THE INVENTION

This invention relates generally to raised floors and, in particular, to an improved cable routing trough for use in connection with raised floors.

BACKGROUND OF THE INVENTION

Raised floors are commonly employed in facilities such as offices, computer rooms and stock exchanges. A typical raised floor system consists of a series of floor panels supported at a predetermined height above the subfloor by vertical pedestals. The raised floor serves as the working floor for the facility. The space between the raised floor and the subfloor is used to accommodate the electric cables; fiber optic lines; pipes; heating, ventilating and air conditioning (HVAC); and other utility services for the facility. Openings are formed in the raised floor to access the various services at desired locations. Organizing the utility services in predetermined routes below the raised floor is advantageous because it provides a clean and uncluttered working space on the raised floor.

Early raised floor systems relied upon the installer to decide how and where to locate the cables, pipes, and similar routing structures for the various utility services. Often the installer chose to place all of the services on the subfloor, without isolating the services from one another. Such installations were problematic for a variety of reasons. One major problem was the potential exposure of electric cables to moisture due to leaks in the subfloor or pipes, and the pooling of water on the subfloor.

In recognition of the problems associated with these early raise floors systems, a variety of designs have been developed in which the utility services are physically separated from each other. In fact, many installations are now subject to building codes mandating physical separation of the various utility services.

One such conventional system is illustrated in U.S. Pat. No. Re. 33,220 ("the Collier '220 patent"), entitled "Modular Combination Floor Support and Electrical Isolation System for Use in Building Structures." The Collier '220 patent discloses a floor structure support system consisting of a raised floor and one or more additional floors disposed beneath the raised floor. The additional floors support and mechanically isolate the cables and other electrical conductors. Side walls can be installed between the floors to define vertical passages to the main working floor. In addition, one of the floors in the Collier '220 patent can be utilized as an HVAC plenum to route conditioned air throughout the facility.

One major drawback of the Collier '220 patent is the difficulty in relocating equipment on the main floor. The Collier system typically requires the installation of new side walls to create a vertical passage to route the electrical cable and other services to the equipment. In addition, since each level of the Collier '220 patent is coextensive with the raised working floor, the cables and other electrical conductors are not disposed in discrete horizontal pathways, but instead can be haphazardly placed or strewn about each level. This type of cable mismanagement makes relocation of equipment inefficient and time consuming, and is potentially hazardous because of the accumulation of disorganized cables on each level.

Another conventional type of system provides a network of troughs for the electric, fiber optic and other cables. An example of a conventional trough system is illustrated in U.S. Pat. No. 4,596,095, entitled "Underfloor Cable Tray Assembly." A major drawback of conventional trough systems is the use of solid sections of trough. These inflexible systems must therefore typically be designed and manufactured for a single installation at a particular location. Once these systems are installed, it is difficult to extend new sections of trough to route utility services to other locations on the raised floor. Extending a trough section perpendicularly from an existing trough can only be accomplished by cutting a hole in the existing straight trough section or replacing the straight trough section with a "T" section and several shorter straight sections. This is a very expensive and time-consuming process, especially in an a existing installation in an occupied facility.

The troughs in conventional systems are often secured directly to the sub-floor, thereby creating an inflexible, semi-permanent installation. Besides being inflexible, locating the troughs near the subfloor presents several drawbacks. First, locating the troughs on or near the subfloor leaves little room for routing water pipes and other services. Second, installation of new cables is inconvenient because the troughs are located a significant distance below the raised floor. Finally, locating the troughs near the subfloor is problematic because the cables can be exposed to moisture if there is water leakage and pooling.

In some areas, building codes require that all under-floor wiring be completely enclosed in a protective wireway or closed trough. Conventional trough systems address these requirements by providing removable covers that are bolted or otherwise secured to the wiring troughs. Cables that exit through the troughs up to the raised floor are enclosed in vertical troughs or "chimneys" which extend between the trough cover and the raised floor. Relocation of the vertical troughs and removal and reinstallation of the trough covers are time-consuming and inconvenient processes. As a result, the covers are often not installed, even though this may violate the local building codes. If the covers are not installed, users often overfill the troughs and drape cables on top of and over the trough edges. This type of cable mismanagement makes maintenance and equipment relocation inefficient and is potentially dangerous. Moreover, in systems where the space between the raised floor and subfloor serves as an air plenum, a failure to install the covers leaves the cables unprotected and allows plenum air to blow freely around the electrical cables, thereby creating fire safety concerns.

It is therefore an object of the present invention to provide a raised floor cable trough system which is flexible and easy to modify in comparison to conventional systems.

Another object of the present invention is to provide a raised floor cable trough system which reduces the potential for damage due to water leakage and pooling on the subfloor.

A further object of the present invention to provide a raised floor cable trough system which reduces the likelihood that the wiring troughs will be overfilled.

Another object of the present invention is to provide a raised floor cable trough system which eliminates the need for trough covers and vertical chimneys.

Still another object of the present invention is to provide a raised floor cable trough system which can be readily retrofitted in an existing raised floor installation.

A further object of the present invention to provide a raised floor cable trough system which eliminates the need for drilling and anchoring into the sub-floor.

Still a further object of the present invention is to provide a raised floor cable trough system in which overfilling of the cable troughs can be detected without removing the floor panels.

An advantage of the present invention is to provide a raised floor cable trough system in which the raised floor panels serve as covers for the wiring troughs.

Another advantage of the present invention to provide a raised floor cable trough system in which the side walls of the wiring troughs include regularly space apertures having removable cover plates for permitting easy installation of perpendicular sections of troughs.

Other objects and advantages of the invention will become apparent upon reading the following detailed description and appended claims, and upon reference to the accompanying drawings.

SUMMARY OF THE INVENTION

These and other objects are achieved by an underfloor cable trough assembly provided for use with a raised floor assemblies of a type having removable floor panels supported above a subfloor by a series of vertical pedestals. Modular cable trough sections are disposed between the subfloor and the raised floor panels and can be joined to form a trough network. At least some of the trough sections have apertures formed in their side walls at regularly spaced intervals. Removable cover plates are disposed in the side wall apertures. The cover plates are adapted to serve as a portion of said trough side wall when installed, and are removable to permit individual trough sections to be joined to each other.

In accordance with another aspect of the present invention, an underfloor cable trough assembly for use with a raised floor has modular cable trough sections disposed between the subfloor and raised floor panels. The trough sections can be joined to form a trough network. The trough sections are positioned such that when the removable floor panels are installed, the floor panels adjacent the trough sections contact the trough side walls and serve as trough covers.

BRIEF DESCRIPTION OF THE DRAWINGS

In the drawings:

FIG. 2 is an exploded perspective view of a vertical support pedestal in combination with a permanently mounted support stringer;

FIG. 3 is an exploded perspective view of a removable stringer support plate;

FIG. 4 is an exploded perspective view of a side wall aperture and a removable cover plate;

FIG. 6 is a side elevation view of one embodiment of a multiple level cable trough system; and FIG. 7 is a side elevation view of a second embodiment of a multiple level cable trough system.

DETAILED DESCRIPTION OF THE PREFERRED EMBODIMENTS

In the following detailed description, spatially orienting terms are used such as "left," "right," "vertical," "horizontal," and the like. It is to be understood that these terms are used for convenience of description of the preferred embodiments by reference to the drawings. These terms do not necessarily describe the absolute location in space, such as left, right, upward, downward, etc., that any part must assume.

Figure 1:
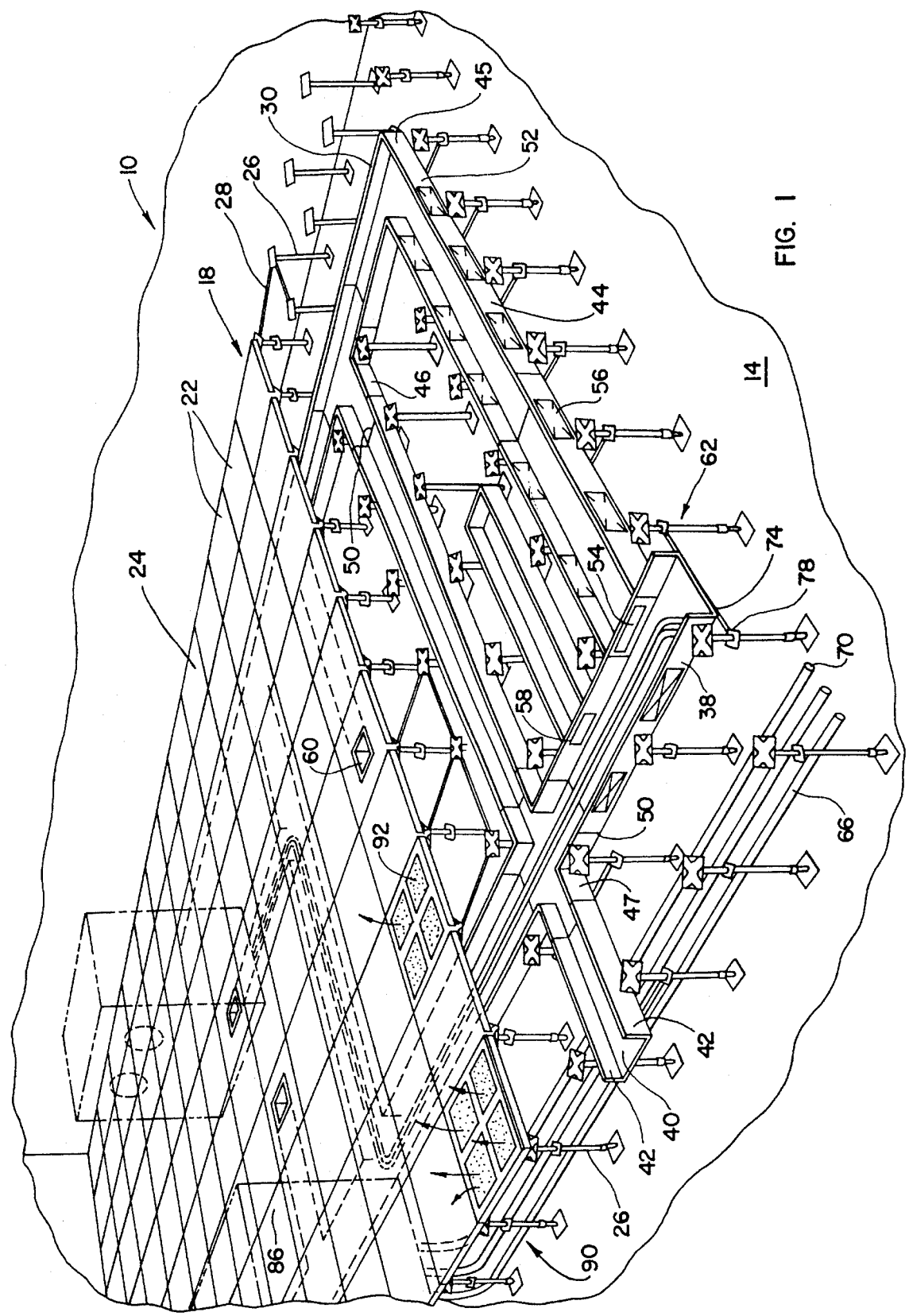
FIG. 1 is an perspective illustration of the modular cable trough assembly in combination with a raised floor system.

Referring initially to FIG. 1, a cable management system 10 according to the present invention will be described by way of example. The cable management system 10 is especially adaptable for use in facilities containing data processing equipment, such as office complexes and computing centers. The cable management system 10 is installed on the permanent floor, namely, the subfloor 14, which is typically constructed from concrete or other suitable building floor materials.

A raised floor assembly 18 includes a plurality of removable floor panels 22 supported at a predetermined height above the subfloor 14 by a series of vertical pedestals 26. The floor panels 22 are generally square-shaped and are laid out side-by-side in a configuration conforming generally to the dimensions of the room in which assembly 18 is installed. Once installed, the floor panels 22 form an elevated work floor 24 above the subfloor 24. The vertical pedestals 26 are arranged in a regular grid pattern and can be secured to the subfloor 14 by appropriate fastening means such as adhesives and threaded fasteners (not shown).

Floor panel stringers 28 extend between the tops of the vertical support pedestals 26. The floor panel stringers 28 serve two purposes. First, they lend lateral support to the vertical support pedestals 26. Second, they provide vertical support to the removable floor panels 22.

A cable trough assembly 30 provides a means or mechanism for routing the electric, fiber optic and other cables to desired locations in the facility. The cable trough assembly 30 includes a plurality of modular cable trough sections 38 disposed between the subfloor 14 and the raised floor panels 22. The trough sections 38 are formed of galvanized steel or other suitable material and preferably have a generally U-shaped cross section. Each trough section 38 has a bottom wall 40 which is generally horizontal when installed and two side walls 42 which extend upwardly from the bottom wall 40.

The modular trough is manufactured in straight sections 44, corner sections 45, T-shaped sections 46, and cross-shaped sections 47. The various sections can be joined together, as indicated by the reference numeral 50, to from a trough network 52. The process for joining the trough sections 38 will be explained in greater detail below. The trough network 52 is laid out in a grid pattern which is easy to expand and reconfigure as computers are relocated.

At least some of the trough sections 38 have apertures 54 disposed in their side walls 42 at regularly spaced intervals. The side wall apertures 54 are generally similar in size and shape to the cross-section of an individual trough section 38. Removable cover plates 56 are disposed in the side wall apertures 54. When installed, the cover plate 56 substantially seals the side wall aperture 54 and serves as a portion of the side wall 42. The cover plates 56 can be removed to permit two trough sections 38 to be joined together, as is indicated by the reference numeral 58. The process for joining the trough sections 38 at the side wall apertures 54 will be explained in greater detail below. The combination of the side wall apertures 54 and removable cover plates 56 provides flexibility during installation and modification of the trough network 52.

The trough network 52 provides a discrete number of restrictive paths for routing electrical and fiber optic cables. Cables carried in the trough network 52 can be accessed by forming apertures 60 in floor panels located above the trough network 52. The restricted-path trough network 52 reduces the problems associated with cable mismanagement, as described above.

The trough sections 38 are supported above the subfloor 14 by a support means 62. Since the trough sections 38 are positioned above the subfloor 14, the danger of damage due to water leakage and pooling is reduced. In addition, the space between the subfloor 14 and trough sections 38 is available for the routing of pipes 66 and conduit 70 for other utility services.

The support means 62 can best be understood by referring additionally to FIG. 2. The support means 62 includes horizontal stringers 74 which extend between the vertical pedestals 26. Preferably, the horizontal stringers 74 are positioned to support the bottom walls 42 of the trough sections 38. The horizontal stringers 74 are in turn supported by stringer support plates 78 mounted on the vertical pedestals 26. The trough sections 38 can be semi-permanently attached to the horizontal stringers 74 by bolts, rivets, or other fastener means (not shown). Since the trough sections 38 are not anchored directly to the subfloor 14, installation and rearrangement of the trough sections 38 is relatively simple in comparison to conventional cable trough systems. Moreover, the horizontal stringers 74 and stringer support plates 78 eliminate the need for drilling and anchoring into the subfloor 14 when the trough sections 38 are installed.

A single level of trough sections 38 supported by only one level of the horizontal stringers 74 can be used to carry all of the various cables. Alternatively, multiple levels of trough sections can be installed between the subfloor 14 and the raised floor panels 28 (See FIGS. 6 and 7). The use of multiple levels of trough sections 38 is advantageous because it permits separation of line voltage from the other cables, as is required by many building codes.

The removable floor panels 22 are adapted to serve as covers for the troughs, thereby eliminating the need for separate trough covers. For this purpose, the horizontal stringers 74 are positioned such that when the removable floor panels 22 are installed, the floor panels adjacent sections of trough contact the tops of the trough side walls 42 and serve as trough covers (see FIG. 6).

Using the floor panels 22 as trough covers is advantageous for several reasons. It eliminates the eliminates the need for separate trough covers and vertical chimneys thereby makes it easier to modify the trough network 52 and to install cables in the network. In addition, this design permits overfilling of the trough network 52 to be detected without removing the floor panels 22. More specifically, if the trough sections 38 are overfilled, the floor panels 22 will not properly fit into place. An improperly fitting floor panel can readily be detected as being out of alignment by a visual inspection of the work floor 24.

A heating, ventilating, and air conditioning (HVAC) unit 86 provides the proper atmospheric conditions for the room. Control of the atmospheric conditions is important in some installations such as computer rooms to ensure proper operation of the computer equipment. The space between the raised floor panels 22 and the subfloor 14 functions as a plenum 90 for routing air from the HVAC unit 86 to desired locations in the room. The HVAC unit 86 forces pressurized and conditioned air into to the air plenum 90. Floor panels having perforations 92 or vents are placed at desired locations in the room to allow the pressurized air to exit the plenum 90 and enter the area above the elevated work floor 24.

Referring now to FIG. 2, an embodiment of a vertical pedestal 26 is illustrated in greater detail. Each vertical pedestal 26 includes a floor panel support plate 94 and a base plate 98 disposed at opposite ends of a support post 102 in the form of a hollow tube. One end of the support post 102 fits over a threaded member 110 extending from the base plate 98. The threaded member 110 is secured to the base plate 98, preferably by welding.

A leveling nut 114 is positioned on the threaded member 110 between the base plate 98 and the support post 102. The diameter of the leveling nut 114 exceeds that of the support post 102 so that the nut 114 provides vertical support for the post 102. The leveling nut 114 can be threaded up and down along the threaded member 110, thereby providing a means for adjusting the height of the vertical pedestal 26.

The floor panel support plate 94 is preferably a two-piece design having a top plate 118 and a bottom plate 122. A cross-shaped bracket 126 is formed in the top plate 122. Each leg 130a–130d of the cross-shaped mounting bracket is adapted to support one floor panel stringer 28. A floor panel stringer 28 is secured to a leg 130 of the cross-shaped bracket 126 by a bolt 134 which passes through the end of the floor panel stringer 28 and engages a threaded aperture 134 in the leg 130. The bottom plate 122 is generally square-shaped and has a central bore 138 conforming to the shape of the support post 102. The bottom plate 122 and top plate 118 are secured together by welding or other similar permanent fastening method. The support post 102 slides through the aperture 138 in the bottom plate 122 and is then permanently secured to the top plate 118 by welding or other similar permanent fastening method.

The vertical pedestal 26 and its related components can assume numerous other embodiments without departing from the scope of the present invention. Examples of alternative embodiments for these elements are illustrated in U.S. Pat. Nos. 3,924,370; 4,630,417; and 4,676,036, the disclosures of which are specifically incorporated by reference herein.

As mentioned above, stringer support plates 78 are attachable to the vertical pedestals 26 for supporting the horizontal stringers 74 at desired heights. The stringer support plates 78 can be permanently or removably attached to the vertical pedestals 26. An embodiment of a permanently attached stringer support plate is illustrated in FIG. 2. The stringer support plate of FIG. 2 is a one piece square-shaped plate 142 having a central bore 146 conforming to the shape of the support post 102. The plate 142 is permanently attached to the support post 102 by welding or other similar permanent fastening method. This process is generally performed during assembly of the vertical pedestal 26.

Each stringer support plate 78 is adapted to support up to four horizontal stringers 74. One horizontal stringer 74 can be extended from each corner of the stringer support plate 78. Posts 150a–150d extend upwardly from the four corners of the plate 142. Each post 150 is adapted to fixedly engage a reciprocal notch (not shown) on the underside of a horizontal stringer when the stringer is positioned on the stringer support plate 78. The horizontal stringer 74 is further secured to the plate 142 by a threaded fastener 154 which passes the end of the horizontal stringer 74 and engages a threaded aperture 158 in the plate 142.

An embodiment of a removable stringer support plate 78 is illustrated in FIG. 3. Removable support plates are advantageous over permanent support plates because they provide more flexibility during the initial installation and any subsequent modifications of the modular trough sections 38. In addition, the removable stringer support plates permit the modular trough sections 38 to be retrofitted into existing raised floor systems. The removable stringer support plate 78 consists of two identical halves 160A, 160B which are adapted to fit around and frictionally engage the support post 102. When installed, the two halves 160A, 160B form a square-shaped plate 142 having generally the same features as the plate 142 of FIG. 2. In addition, a sleeve 162 extends from central bore 146 of the plate 142. Threaded fasteners 166 and reciprocally-threaded apertures 170 are provided for securing the two halves 160A, 160B together. When the two halves 160A, 160B are assembled in this manner, the sleeve 162 and central bore 146 fit around and frictionally engage the support post 102.

Figure 5:
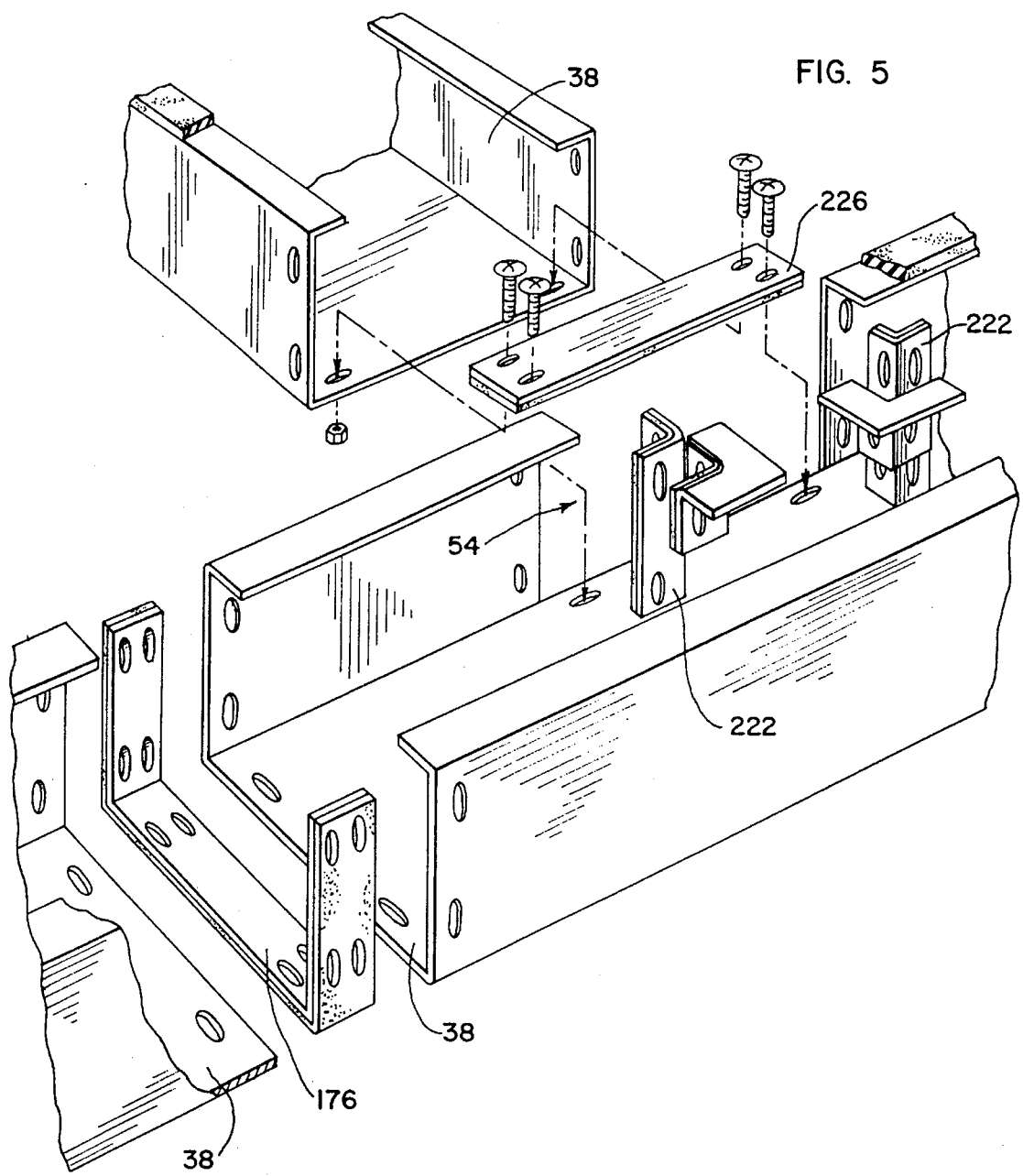
FIG. 5 is an exploded perspective view of two trough sections joined at a side wall aperture.

Referring now to FIGS. 4 and 5, the methods for joining the trough sections 38 will be described in greater detail. As previously mentioned, each trough section 38 has a bottom wall 40 which is generally horizontal when installed and two side walls 42. The side walls 42 extend upwardly from the bottom wall 40 and terminate in horizontal flange portions 172. Gasket material 174 is disposed on top of the flange 172, thereby restricting entry of plenum air into the trough network 52 when the floor panels 22 are installed.

As was mentioned above, the trough sections 38 can be joined to form a trough network 52 which is easy to expand and reconfigure as computers, for example, are relocated. The various trough sections can be joined together lengthwise by using U-shaped brackets 176 and threaded fasteners 178 or rivets (not shown). This process is best understood by referring to FIG. 5. Gasket material 174 is disposed between the U-shaped bracket 176 and the trough sections 38 to restricting entry of plenum air into the trough network 52.

In addition, the side wall apertures 54 permit sections of trough to be joined perpendicularly to one another. Preferably, the apertures 54 are formed in both side walls 42 of a given trough section; however, it is conceivable that apertures can be formed in only one side wall of a trough section. Mounting apertures 190 formed in the trough section around each side wall aperture 54 are provided for attaching either the cover plate 56 or a trough section 38.

When installed, the cover plate 56 seals the side wall aperture 54 and serves as a portion of the side wall 42. More specifically, each cover plate 56 includes a flat center plate 198 which is generally similar in size and shape to side wall aperture 54. Mounting flanges 202 extend from opposing ends of the center plate 198 in the same plane as the center plate 198. In addition, a mounting flange extends 206 from the bottom of the center plate 198 in a plane generally perpendicular to the center plate 198. Mounting apertures formed in the mounting flanges 202, 206 are adapted to align with the mounting apertures 190 in the trough section when the cover plate 56 is installed. The cover plates 56 are removably secured to the trough section 38 by threaded fasteners 212 or other means (not shown).

Each cover plate 56 also includes a horizontal flange portion 214 which extends from the top of the center plate 198 and which aligns with the horizontal flange 172 when the cover plate 56 is installed. Gasket material 174 is disposed between the cover plate 56 and trough section 38 and also on top of the horizontal flange 214.

The cover plates 56 can be removed to permit two trough sections 38 to be joined perpendicularly to each other. Two trough sections 38 are joined in this manner using L-shaped brackets 222 to connect the trough side walls 42 and a flat plate 226 or bracket to connect the bottom walls 40 of the trough sections. Gasket material 174 is disposed between the brackets 222, 226 and the trough sections 38.

In some installations it is desirable to provide more than one level of cable trough networks. This can be accomplished by providing multiple levels of horizontal stringers 74 to carry separate levels of trough network. For example, an upper or main trough network can be utilized to carry all cables except for the line voltage cable. The line voltage can be installed in a lower or secondary trough network supported on a lower level of horizontal stringers 74. Trough sections identical to those previously discussed can be utilized for each level of trough network. However, the floor panels can only serve as covers for the upper trough network. Trough sections on levels other than the top level can include trough covers (not shown) removably secured to the side walls 42 of the trough sections 38.

Alternatively, the lower level trough networks can be constructed of materials other than the previously discussed modular trough sections 38. Embodiments for such alternatives are illustrated in FIGS. 6 and 7. In FIG. 6, the line voltage is routed in a lower level trough network 232 supported by a lower level of horizontal stringers 74. Stringers 74 supporting lower level network 232 can be formed from the same stringers 76 supporting modular trough sections 38, as the stringers 74 and 76 are substantially identical in structure and function. Electrical conduit 236 is used to route line voltage conductors from the lower level cable network to floor box outlets 238 mounted in the floor panels 22. In FIG. 7, a single level of horizontal stringers 74 is used to support a two level of trough network. Again, electrical conduit 236 is used to route conductors from the lower level trough network to floor box outlets 238 installed in floor panels 22.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. An underfloor cable trough assembly for use with a raised floor assembly of the type having removable raised floor panels supported above a subfloor by a series of vertical pedestals, the assembly comprising:

modular cable trough sections adapted to be disposed between the subfloor and the raised floor panels, each of said trough sections including a continuous bottom wall and two upstanding side walls, at least some of said trough sections having apertures formed in their side walls at regularly spaced intervals;

removable cover plates normally disposed in the side wall apertures, said cover plates being adapted to serve as a portion of said trough side wall when installed and being removable to permit individual trough sections to be joined to each other; and means for joining individual trough sections to form a trough network.

2. The underfloor cable trough assembly of claim 1, wherein the side wall apertures are formed in only one side wall of a respective trough section.

3. The underfloor cable trough assembly of claim 1, wherein extending a trough section from a side wall aperture in another trough section renders the side walls of the two trough sections perpendicular.

4. The underfloor cable trough assembly of claim 1, wherein said trough sections include straight sections, corner sections, T-shaped sections and cross-shaped sections.

5. The underfloor cable trough assembly of claim 1, further comprising support means for supporting said trough sections above the subfloor.

6. The under,floor cable trough assembly of claim 5, wherein said support means comprises horizontal stringers adapted to extend between the vertical pedestals.

7. The underfloor cable trough assembly of claim 6, wherein said support means further comprises stringer support plates mounted on the vertical pedestals and being adapted to support said horizontal stringers.

8. The underfloor cable trough assembly of claim 7, wherein the height of said stringer support plates can be varied.

9. The underfloor cable trough assembly of claim 8, wherein said stringer support plates are removably attachable to the vertical pedestals.

10. The underfloor cable trough assembly of 7, wherein said stringer support plates are permanently attached to the vertical pedestals.

11. The underfloor cable trough assembly of claim 7, wherein multiple levels of said trough sections can be installed between the subfloor and the raised floor panels.

12. The underfloor cable trough assembly of claim 11, including covers for said trough sections.

13. The underfloor cable trough assembly of claim 12, wherein:

the trough sections on the top level are positioned such that when the removable floor panels are installed, the floor panels adjacent said modular trough of trough contact the tops of said trough side walls and serve as trough covers; and trough sections on levels other than said top level include trough covers removably secured to the top of said trough side walls.

14. The underfloor cable trough assembly of claim 1, wherein said trough sections are positioned such that when the removable floor panels are installed, the floor panels adjacent said trough sections contact the tops of said trough side walls and serve as trough covers.

15. The underfloor cable trough assembly of claim 14, including a sealing gasket disposed between said trough side walls and the floor panels.

16. An cable management system for installation on a building subfloor, the system comprising:

vertical pedestals arranged on the building subfloor;

removable raised floor panels supported above the subfloor by said vertical pedestals;

modular cable trough sections adapted to be disposed between the subfloor and said raised floor panels, each of said trough sections including a continuous bottom wall and two upstanding side walls, at least some of said trough sections including apertures formed in their side walls at regularly spaced intervals;

removable cover plates normally disposed in the side wall apertures, said cover plates being adapted to serve as a portion of said trough side walls when installed and being removable to permit individual trough sections to be joined to each other; and means for joining individual trough sections to form a trough network.

17. The underfloor cable trough assembly of claim 16, wherein multiple levels of said trough sections can be installed between the subfloor and the raised floor panels.

18. The underfloor cable trough assembly of claim 19, further comprising covers for said trough sections.

19. The underfloor cable trough assembly of claim 18, wherein:

trough sections on the top level are positioned such that when the removable floor panels are installed, the floor panels adjacent said modular trough of trough contact the tops of said trough side walls and serve as trough covers; and trough sections on levels other than said top level include trough covers removably secured to the top of said trough side walls.

20. The underfloor cable trough assembly of claim 19, wherein said trough sections are positioned such that when the removable floor panels are installed, the floor panels adjacent said trough sections contact the tops of said trough side walls and serve as trough covers.

21. The cable management system of claim 20, wherein said trough sections include straight sections, corner sections, T-shaped sections and cross-shaped sections.

22. The cable management system of claim 20, wherein the space between the subfloor and said raised floor panels serves as an air plenum.

23. The cable management system of claim 22, wherein at least one of said raised floor panels is perforated.

24. The underfloor cable trough system of claims 22, further comprising a sealing gasket disposed between said trough side walls and said raised floor panels.

25. The cable management system of claim 20, further support means for supporting said cable trough sections above the subfloor.

26. The cable management system of claim 25, wherein said support means comprises horizontal stringers adapted to extend between said vertical pedestals.

27. The cable management system of claim 26, wherein the support means further comprises stringer plates mounted on said vertical pedestals and being adapted to support said horizontal stringers.

28. The cable management system of claim 27, wherein the height of said stringer support plates can be varied.

29. The cable management system of claim 28, wherein said stringer support plates are removably attachable to said vertical pedestals.

30. The cable management system of 27, wherein said stringer support plates are permanently attached to said vertical pedestals.

31. The cable management system of claim 20, wherein the apertures are only formed in one side wall of a respective trough section.

32. The underfloor cable trough assembly of claim 20, wherein extending a trough section from a side wall aperture in another trough section renders the side walls of the two trough sections perpendicular.

* * * * *